United States Patent [19]

Siegfried

[11] Patent Number: 4,867,264

[45] Date of Patent: * Sep. 19, 1989

[54] APPARATUS AND METHOD FOR INVESTIGATING WELLBORES AND THE LIKE

[75] Inventor: Robert W. Siegfried, Frisco, Tex.

[73] Assignee: Atlantic Richfield Company, Los Angeles, Calif.

[*] Notice: The portion of the term of this patent subsequent to Mar. 3, 2004 has been disclaimed.

[21] Appl. No.: 170,616

[22] Filed: Mar. 11, 1988

Related U.S. Application Data

[63] Continuation of Ser. No. 908,129, Sep. 17, 1986, abandoned.

[51] Int. Cl.$^4$ .............................................. G01V 1/40
[52] U.S. Cl. ............................................... 181/105; 367/35; 367/69
[58] Field of Search .................................. 181/102–106, 181/111, 112; 367/25, 27, 28, 29, 30, 35, 57, 69, 86, 88, 153, 911, 912; 73/151, 151.5, 152

[56] References Cited

U.S. PATENT DOCUMENTS

| | | | |
|---|---|---|---|
| Re. 31,607 | 6/1984 | Vogel et al. | 181/102 X |
| 2,963,641 | 12/1960 | Nanz | 181/102 |
| 3,475,722 | 10/1969 | White | 181/104 X |
| 3,978,939 | 9/1976 | Trouiller | 181/104 |
| 4,380,808 | 4/1983 | Hill et al. | 367/173 X |
| 4,587,641 | 5/1986 | DiFoggio | 181/105 |
| 4,601,024 | 7/1986 | Broding | 367/86 |
| 4,646,565 | 3/1987 | Siegfried | 181/105 X |
| 4,665,511 | 5/1987 | Rodney et al. | 367/27 X |
| 4,701,892 | 10/1987 | Anderson | 367/35 |
| 4,733,380 | 3/1988 | Havira | 367/35 |

OTHER PUBLICATIONS

Zemanek et al., The borehole Televiewer-A New Logging Concept..., Journal Petroleum Technology, Jun. 1969, pp. 762-774.

*Primary Examiner*—Brian S. Steinberger
*Attorney, Agent, or Firm*—Michael E. Martin

[57] ABSTRACT

An apparatus useful in investigating the wall surfaces of a structure defining a cavity comprising: a tool having a periphery and being capable of being at least partially located in the cavity; and a plurality of transducers located at different points on the periphery of the tool, each of the transducers being capable of sending first signals toward the wall surfaces of the cavity and receiving reflected second signals. An improved method for investigating the wall surfaces of a structure defining a cavity is also disclosed.

10 Claims, 1 Drawing Sheet

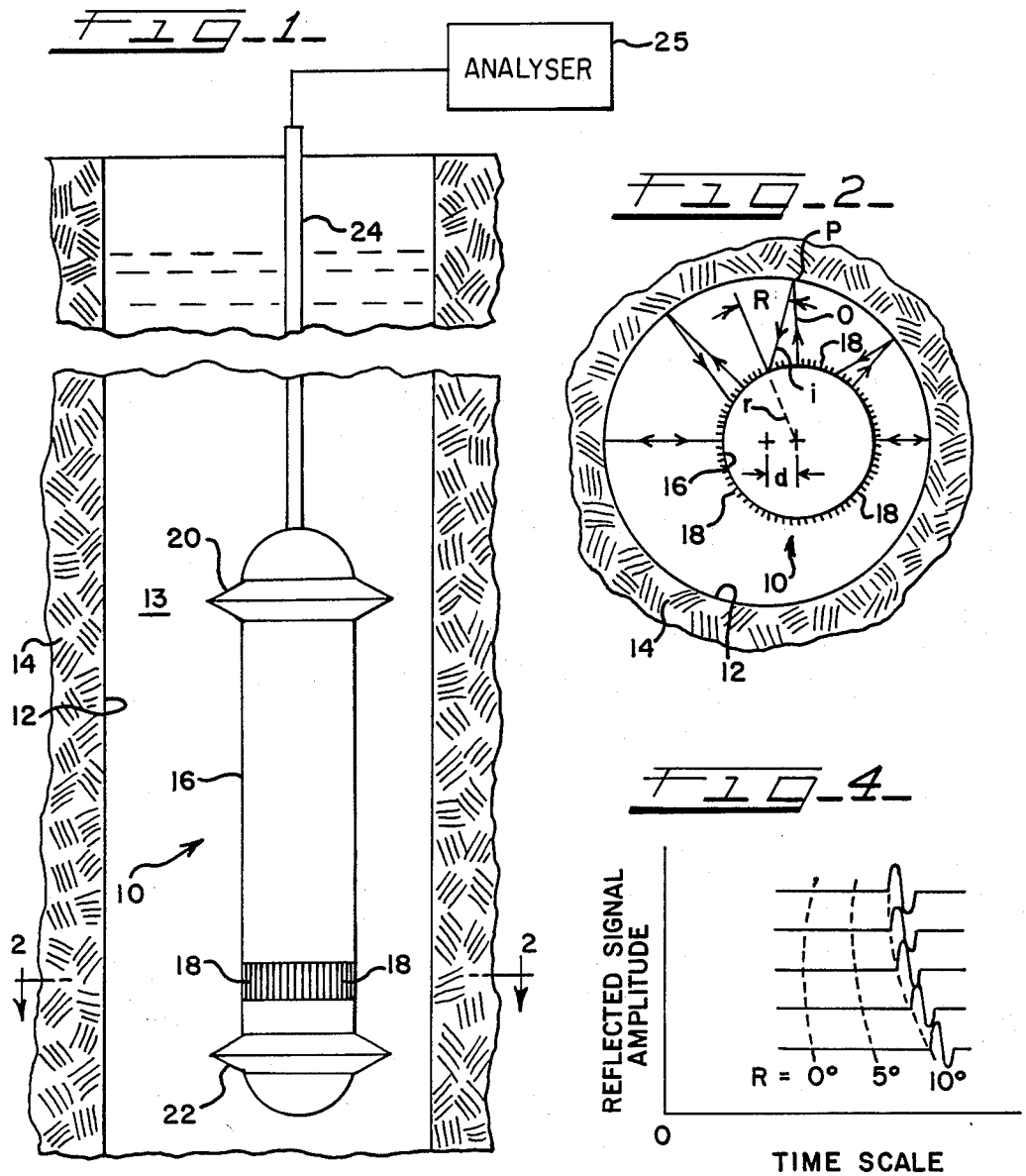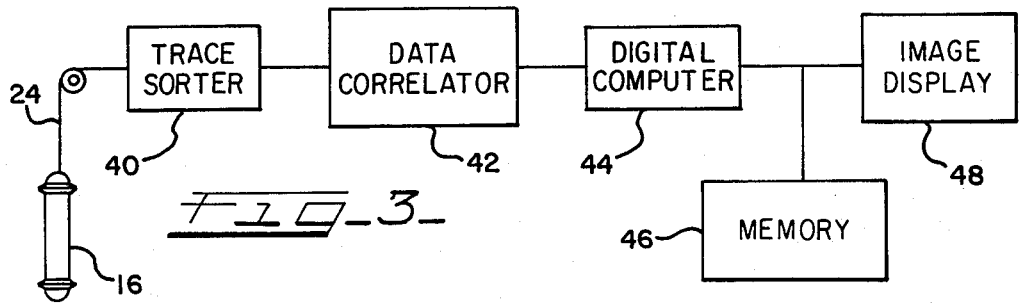

APPARATUS AND METHOD FOR INVESTIGATING WELLBORES AND THE LIKE

This application is a continuation of application Ser. No. 908,129 filed Sept. 17, 1986, now abandoned.

This invention relates to an improved system for investigating the wall surfaces of a structure defining a cavity. More particularly, the invention relates to an improved apparatus and method for investigating a formation in the earth which is traversed by a borehole and including structures such as casings, tubing, and similar structures both above and below the earth's surface.

Various instruments have been suggested and used to provide ultrasonic images of the surface of a borehole sidewall for purposes of identifying fractures, vugs, bedding and other features of geologic or engineering interest. One example of such a device is described in "The Borehole Televiewer-A New Logging Concept for Fracture Location and Other Types of Borehole Inspection", by J. Zemanek, et al., Journal of Petroleum Technology, June 1969. Zemanek, et al, discloses one rotating transducer within a tool which generates an ultrasonic signal which passes through the oil with which the sonde is filled and the acoustic window into the borehole fluid. The signal is then reflected from the borehole sidewall and detected using the same transducer. Ideally, the tool of Zemanek, et al is run centralized in the borehole, however, in practice it is often eccentered.

The Zemanek, et al device can provide useful ultrasonic images. However, there are several significant problems. For example, the rotating transducer assembly involves mechanical complexity which tends to decrease reliability. Also, if the tool is not centralized or if the wall surface or the surfaces of the wellbore or other structure being investigated is not circular in cross-section, the reflected signals may not return to the transducer. This limitation impacts on the utility of the Zemanek, et al device in deviated holes, for example, where centralization is difficult to achieve. Further, as a result of passing through the oil and the acoustic window, the ultrasonic signals generated by the Zemanek, et al device are narrow band and not well localized in time. This presents difficulties if the signals are to be analyzed in order to gain information regarding conditions deeper than the borehole sidewall.

Other acoustic well logging methods and apparatus are discussed in U.S. Pat. No. 3,978,939. Many of these devices involve separate signal transmitting transducers and signal receiving transducers, and/or relatively complex mechanical and structural systems. Clearly, there is a need for improved borehole imaging.

Therefore, one object of the present invention is to provide an improved apparatus for investigating the surfaces of a structure defining a cavity including boreholes in a formation in the earth.

Another object of the invention is to provide an improved method for investigating structures defining cavities, such as a formation in the earth traversed by a fluid-filled, sidewalled borehole. Other objects and advantages of the present invention will become apparent hereinafter.

An improved system for investigating the wall surfaces of a structure defining a cavity has been discovered. In one broad aspect, the present invention involves an apparatus useful in investigating the wall surfaces of a structure defining a cavity e.g., a borehole in a formation in the earth, comprising: tool means having a periphery and being capable of being at least partially located within the cavity, e.g., borehole; and a plurality of transducer means located at different points on the periphery of the tool means, each of the transducer means being capable of sending first signals toward the wall surfaces, e.g., sidewall, of the cavity, e.g., borehole, and receiving reflected second signals. These reflected second signals can be analyzed to provide information regarding the structure, e.g., formation.

In another broad aspect, the invention involves an improved method for investigating the wall surfaces of a structure defining a cavity, e.g., a formation in the earth traversed by a fluid filled, sidewalled borehole, which includes analyzing reflected signals received by at least one transducer. The present improvement comprises: (a) placing a plurality of transducers at different locations on the periphery of a tool located in the cavity, e.g., borehole; (b) causing first signals from at least one of the transducers to be sent toward the wall surfaces of the cavity, e.g., the sidewall of the borehole; and (c) causing reflected signals to be received by at least a portion of the transducers. The transducers are preferably placed in a substantially co-planar array.

The present system provides substantial advantages. For example, the present apparatus is mechanically less complex than existing borehole ultrasonic imaging devices and is, therefore, more reliable. The present system has the capability of acquiring useful data around the entire circumference of the cavity or borehole, which has often not been possible with previous devices. Conventional televiewer signals are substantially degraded in passing through the necessary acoustic window of many previous devices. Since the present system does not require an acoustic window, the reflected signals received by the transducers are more representative of the actual properties of the structure or formation.

The present apparatus is preferably structured so that the plurality of transducer means remain substantially stationary while the first signals are sent and the second signals are received. For example, the transducer means preferably do not rotate during signal sending/receiving as does the single transducer in the Zemanek, et al device discussed previously. It is preferred that the transducer means be situated in a substantially circular, substantially co-planar array around the periphery of the tool means, which is preferably substantially circular in cross-section perpendicular to the longitudinal axis of tool means.

The number of transducer means controls the horizontal resolution of the apparatus and may vary over a wide range, for example, depending on the specific formation and structure being investigated. The number is preferably sufficient to provide useful information around substantially all the circumference of the cavity. Excessive numbers of transducer means are to be avoided since no real advantage is achieved and the electronics and ancillary analytical equipment may become unduly complex and unwieldy. More preferably, the number of transducer means employed is in the range of about 10 to about 500, still more preferably about 150 to about 350. The transducer means are preferably substantially uniformly spaced on the periphery of the tool means.

The transducer means employed preferably comprise conventional acoustic transducers, e.g., comprising piezoelectric material. The configuration and arrangement of the transducers may vary but they may be situated so that the longitudinal axes of the transducers are substantially parallel to the longitudinal axis of the tool means. The first and second signals are preferably sound or acoustic signals, more preferably ultrasonic signals.

The tool means, preferably comprising a logging sonde, provides a structure on which the transducer means can be located. In addition, the tool means preferably includes activating means, e.g., involving conventional electronics, which excite one or more of the transducer means, as desired, to generate the first signals, and transmitting means, e.g., involving conventional electronic means, to transmit third signals, preferably electronic signals, corresponding to the reflected second signals from the transducer means to analyzer means, e.g., equipment located on the earth's surface above the formation being investigated, which acts to receive the third signals and to derive information relating to the structure in response to the third signals. The analyzer means preferably includes a display means acting to provide a visual display, e.g., an ultrasound image, of at least a portion of the information. The analyzer means preferably includes memory means, e.g., a digital computer acting to store at least one of (1) the third signals or (2) the structure information derived from the third signals. The activating means, transmitting means and analyzer means employed may comprise equipment which is conventional and well known in the art. In view of this, a detailed discussion of the various components and functioning of such means is not included here.

The tool means preferably is attached to a cable or the like the position of which can be adjusted to raise or lower the transducer means in the cavity being investigated. This allows the structure to be investigated at various depths.

The present system is useful for investigating the wall surfaces of any structure defining a cavity, provided the cavity is of suitable size. The present invention is particularly applicable in investigating a formation in the earth traversed with a fluid filled, sidewalled borehole. Such boreholes can be lined with casing and/or other conventional drilling and hydrocarbon production components. In addition, all or a part of the sidewall of the borehole may be the subterranean formation itself.

These and other aspects and advantages of the present invention are set forth in the following detailed description and claims, particularly when considered in conjunction with the accompanying drawings in which like part bear like reference numerals. In the drawings:

FIG. 1 is a representation of an embodiment of the present apparatus inside a borehole.

FIG. 2 is a view taken along line 2—2 of FIG. 1 showing the paths of certain transmitted and reflected acoustic signals.

FIG. 3 is a schematic illustration of an embodiment of the present apparatus.

FIG. 4 is an illustrative plot of reflected signal amplitude versus time based on information obtained by the embodiment of the present apparatus shown in FIG. 1.

Referring now to the drawings, FIG. 1 shows an acoustic logging apparatus, shown generally as 10, located in a borehole 12 in a subterranean formation 14. Borehole 12 is filled with conventional borehole fluid 13. Apparatus 10 includes a substantially cylindrical tool 16 and a circular array of 250 piezoelectric, acoustic transducers 18. Also included is a top centralizer element 20 and a bottom centralizer element 22 each of which is secured to tool 16. A flexible cable 24 provides support for apparatus 10 in borehole 12 and also provides communication between the electronics in tool 16 and equipment on the earth's surface, shown generally in FIG. 1 as 25, and more specifically in FIG. 3.

Tool 16 includes an activator circuit which simultaneously excites transducers 18 to send an acoustic wave propagating through borehole fluid 13 toward the sidewall of borehole 12. Tool 16 also includes an electronic signal transmitter which is capable of transmitting electronic signals representing the acoustic reflected signals received by each transducer 18 to surface equipment 25 for further processing and analysis. While these acoustic signals are generated by transducers 18 and then the reflected signals are received by transducers 18, tool 16 and transducers 18 remain substantially stationary, e.g., tool 16 and transducers 18 are not rotated. Tool 16 can be moved relatively slowly up or down, as the case may be, in borehole 12 during data acquisition by the transducers 18 to obtain information about formation 14. Information regarding the formation is substantially continuously acquired as tool 16 is moved up or down borehole 12.

FIG. 3 schematically shows tool 16 in combination with conventional surface equipment. A trace sorter 40 receives signals from individual transducers 18 or sub-arrays of transducers 18 via tool 16 and cable 24 and gathers the individual reflected signal traces into an appropriate order corresponding to particular locations of individual transducers 18 or sub-arrays of transducers 18 on the circumference or periphery of tool 16. A data correlator 42 scans the trace of each individual transducer 18 or sub-arrays of transducers 18 to determine, as will be discussed hereinafter, the angle, referred to hereinafter as R, see FIG. 2, at which the reflected wavefront impinges on each individual transducer 18 or sub-arrays of transducers 18.

Traveltime, hereinafter referred to as T, and reflection amplitude, hereinafter referred to as A, are also determined by data correlator 42, as will be discussed hereinafter. These data, R, T, and A are provided to a digital computer 44, which is programmed to calculate the distance, hereinafter referred to as i, see FIG. 2, to the reflection point and to translate the amplitude data into a pixel image format. As the image data accumulates, it is recorded in a memory device 46, e.g., magnetic tape or other data storage system or subsystem, and/or is sent to an image display device 48 which provides a visual display of the portion of formation 14 investigated by apparatus 10 based on the reflected signals received by transducers 18. Each of trace sorter 42, digital computer 44, memory device 46 and image display device 48 may be selected from conventional components. One component may include more than one of the enumerated items. For example, a single computer may include both digital computer 44 and memory device 46. Also a single computer (digital) may be used with appropriate analog/digital devices, or dedicated digital or analog devices can be used.

In operation, all transducers 18 are excited simultaneously, generating a cylindrical wave propagating toward the sidewall of borehole 12. As portions of this wave impinge on the sidewall of borehole 12, reflections would be generated which would travel back toward tool 16.

In the ideal mode of operation, the acoustic energy received at each individual transducer 18 would be recorded separately. The energy received from subsets of the array of transducers 18 would then be analyzed in order to determine the incident angle, R, and a traveltime, T, for the specular reflection impinging on tool 16 at the location of each transducer 18. The analysis is as follows. Depending on the angle, R, at which the reflected wavefront is impinging on the individual transducer 18 or sub-array of transducers 18, the arrival times will vary and be along a particular trajectory as illustrated in FIG. 4. If a sub-array of transducers 18 is used instead of individual transducers 18, R is determined by summing the reflected signals along the various trajectories and the value of R corresponding to the maximum coherence of the reflected signals is taken to represent the incident angle of the reflected wavefront at the center point of the sub-array of transducers 18.

The traveltime, T, between transducer excitation and the reflected signal being received by transducer 18 or sub-array of transducers 18 is readily determined. Given a knowledge of the acoustic velocity of borehole fluid 13, this traveltime is readily converted to the distance, U, equal to the total path length between the transmitting and receiving transducers 18, i.e., the sum of i plus 0, see FIG. 2. Knowing R, the reflected signal path length, i, is:

$$i = \frac{U}{2}\left[\frac{2r + U}{r(1 + \cos R) + U}\right]$$

wherein r = is the radius of the circular array of transducers 18.

The parameters i and R thus allow the reflection point, hereinafter referred to as P see FIG. 2, on the sidewall of borehole 12 to be located with respect to tool 16, and the reflection amplitude A observed at the selected sub-array of transducers 18 may be associated with the point P in the image display. Thus, as long as the offset of tool 16 from the center of borehole 12, designated as d in FIG. 2, is less than one-half the radius of tool 16, designated as r in FIG. 2 (note that centralizer elements 20 and 22 are sized to allow the geometry of the system to meet this criterion), reflection amplitude and traveltime information may be obtained around the entire circumference of borehole 12. The information density will, however, depend on R, with the greatest density and spatial resolution occurring where R equals zero.

In practice, traces associated with individual subarrays of transducers 18 may be recorded and analyzed for separate exciting of transducers 18, effectively providing an electronic scan around the sidewall of borehole 12, analogous to that obtained mechanically with a single rotating transducer. In the limit, the trace for each individual transducer 18 could be recorded for separate excitings of transducers 18, and the traces could then be gathered to simulate from an appropriate sub-array of transducers 18.

The present logging system, e.g., apparatus 10 and associated equipment 25, provides a very effective approach to investigating subterranean formations. The system is relatively simple in structure and operation. No acoustic window is required, thus allowing the elimination of signal degradation resulting from such window. Relatively high resolution, ultrasonic images all around the borehole can be obtained. In short, the present apparatus and method provide substantial advantages relative to prior acoustic logging devices.

While this invention has been described with respect to various specific examples and embodiments, it is to be understood that the invention is not limited thereto and that it can be variously practiced within the scope of the following claims.

The embodiments of the present invention in which an exclusive property or privilege is claimed are as follows:

1. Apparatus for investigating the wall surface of a structure defining a cavity including borehole structures, said apparatus comprising:
   a tool adapted to be lowered into said cavity, said tool including a plurality of acoustic signal emitting and receiving transducers arranged spaced from said wall surface in a single substantially circumferential coplanar array on said tool and being supported on said tool stationary relative to said tool;
   each of said transducers being adapted to emit a first acoustic signal toward said wall surface, said first signal being capable of being reflected from said wall surface back toward said array of transducer as a second acoustic signal and said transducers each having capable of receiving said second signals reflected from said wall surface and generating third electrical signals, respectively, related to the respective second signals received by said transducers;
   means for causing said transducers to emit said first signals as a substantially continuous circumferential wavefront with respect to said tool and said array of transducers; and
   means for receiving said third signals generated by said transducer and for comparing said third signals with each other for generating a visual image of said wall surface.

2. The apparatus of claim 1 wherein:
said means for receiving includes a display means for providing said visual image.

3. The apparatus set forth in claim 1 wherein:
said transducers of said array are substantially coplanar in a plane extending normal with respect to a longitudinal axis of said tool.

4. The apparatus set forth in claim 1 wherein:
the number of transducers in said array is in the range of about 150 to about 350.

5. The apparatus set forth in claim 1 wherein
said tool includes means operable to sum selected ones of said third signals and said apparatus further comprises means operable to receive a resultant signal based on said selected ones of said third signals and to provide a visual image of said wall surface based on said signals emitted, received and generated by said apparatus, respectively.

6. The apparatus set forth in claim 1 wherein:
said array of transducers is substantially circular and defines a radius of said tool, and said array of transducers is adapted to transmit and receive said first and second signals, respectively, with said tool disposed in said wellbore in a position offset from the longitudinal centerline of said wellbore less than one-half said radius of said tool.

7. The apparatus set forth in claim 6, including:

centralized means on said tool adapted to permit movement of said tool transversely with respect to said centerline of said wellbore up to a distance of less than one-half of said radius of said tool.

8. A method for investigating the wall surface of a structure defining a cavity including borehole structures comprising the steps of:

providing a tool insertable in said cavity, said tool having a plurality of transducers arranged spaced from said wall surface in a circumferential coplanar array, and said transducers being stationary with respect to said tool, said transducers each being capable of emitting a first acoustic signal capable of being reflected from said wall surface back toward others of said transducers of said array as a second acoustic signal, said transducers each being adapted to receive said second signal and to generate a third electrical signal derived from said second signal for providing a visual image of said wall surface;

positioning said tool in said cavity and operating at least selected ones of said transducers to emit said first signals;

causing said transducers to receive said second signals and to emit said third signals;

summing selected sets of third signals emitted by selected sub-arrays of said transducers to determine the angle of incidence of said second signal on a selected transducer of each of said sub-arrays;

measuring travel time from emission of said first signal to receipt of said second signal by each said selected transducer of each said selected sub-array; and measuring the signal amplitude of said second signal received by said selected transducer of said selected sub-array to generate a visual image of said wall surface formed by a selected number of second signals and their amplitudes, respectively.

9. The method set forth in claim 8, including the step of:

determining the total path length traveled by a first signal and the resultant second signal based on the reflection of said first signal from measurement of the travel time of said first and second signals between transducers of said array and the acoustic velocity of fluid in said wellbore;

determining the path length of said second signal between said wall surface and the selected transducer of said selected sub-array receiving said second signal; and determining the signal reflection point on said wall surface at which a selected first signal is reflected as a second signal with respect to said tool.

10. The method set forth in claim 9 including:

recording third signals from said selected sub-arrays of said transducers and repeating the emission of first signals from said array of transducers and determining the signal reflection point for a second signal resulting from each first signal for a selected sub-array of transducers until a circumferential scan of said wall surface is obtained.

* * * * *